United States Patent [19]

Pedersen

[11] Patent Number: 5,719,697
[45] Date of Patent: Feb. 17, 1998

[54] METHOD AND APPARATUS FOR COMBINING ADD/DROP OPTICAL SIGNAL LINES FROM A PLURALITY OF BRANCHING UNITS

[75] Inventor: Bo Pedersen, Rumson, N.J.

[73] Assignee: AT&T Submarine Systems, Inc., Morristown, N.J.

[21] Appl. No.: 728,651

[22] Filed: Oct. 10, 1996

[51] Int. Cl.⁶ ................................................. H01S 03/00
[52] U.S. Cl. ............................................ 359/341; 359/124
[58] Field of Search ............................ 359/124, 161, 359/341, 337

[56] References Cited

U.S. PATENT DOCUMENTS

| | | | |
|---|---|---|---|
| 5,463,487 | 10/1995 | Epworth | 359/124 |
| 5,566,018 | 10/1996 | Lee et al. | 359/341 |
| 5,612,805 | 3/1997 | Fevrier et al. | 359/124 |

*Primary Examiner*—Mark Hellner
*Attorney, Agent, or Firm*—Mark K. Young

[57] ABSTRACT

An optical signal processing method and apparatus for providing a noise feedback loop that uses existing noise within the optical system to saturate a chain of amplifiers after the branching unit, thereby preventing information channels in a WDM signal containing empty channels from becoming overamplified as they pass through downstream amplifiers. The method and apparatus uses an existing drop amplifier which emits ASE noise as a side effect. A coupler connects the ASE noise to a filter. The filtered ASE noise is fed into an existing trunk amplifier by a second coupler. The trunk amplifier increases gain to the filtered ASE noise to a level high enough to saturate the amplifier chain, without requiring an external noise generating device.

1 Claim, 3 Drawing Sheets

METHOD AND APPARATUS FOR COMBINING ADD/DROP OPTICAL SIGNAL LINES FROM A PLURALITY OF BRANCHING UNITS

FIELD OF THE INVENTION

The invention relates to optical signal processing. More particularly, the invention relates to filling empty channels of a wavelength-multiplexed signal with noise to prevent over-amplification of the remaining channels carrying actual data, as the wavelength-multiplexed signal passes through an optical power amplifier.

BACKGROUND OF THE INVENTION

The transmission distance of any fiber-optic communication system is limited by fiber loss and dispersion. For long-haul lightwave systems (e.g., submarine systems) this limitation is overcome using optical amplifiers. Optical amplifiers amplify incident light through stimulated emission, the same mechanism used by lasers. As shown in FIG. 4, an amplifier is designed to boost the gain of a signal above its operating point threshold when signal power falls below this threshold.

One advantage of optical amplifiers is that they can be used to amplify several communication channels simultaneously, such as those carried on a wavelength division multiplexed (WDM) signal. A problem arises, however, when a WDM signal contains empty channels. As the WDM signal passes through an optical amplifier, such as an erbium doped fiber amplifier (EDFA), the EDFA over-amplifies the remaining channel(s). The elevated power of the remaining channel(s) results in nonlinear effects, such as stimulated Raman scattering (SRS), stimulated Brillouin scattering (SBS), and self-phase modulation (SPM). SRS and SBS can lead to considerable fiber loss. SPM leads to frequency/wavelength shift of parts of the information pulses, leading to an increase in errors.

Such a situation occurs in lightwave systems using add/drop multiplexers (ADMs) or other types of branching units. A branching unit is known as a key device for use in splitting and inserting WDM signals. For example, an ADM demultiplexes a WDM signal and routes a wavelength of lambda ($\lambda$) i to a desired destination. It then adds a wavelength of $\lambda$ i to the remaining wavelengths and multiplexes them together to form a new WDM signal.

If a fiber cut occurs prior to the input port of an ADM, the WDM signal is lost and a null signal is inputted to the ADM. ADM adds $\lambda$ i and multiplexes $\lambda$ i with the null signal and launches it into the transmission medium. Thus the multiplexed signal contains a single information channel, while the rest remain empty. When this signal is processed by an optical amplifier, the amplifier increases power to channel $\lambda$ i well beyond its normal operating point threshold. This problem is not addressed by conventional lightwave systems.

SUMMARY OF THE INVENTION

In view of the foregoing, there exists a need in the art for a method and apparatus for preventing an optical amplifier from over-amplifying the information channels of a WDM signal which also contains a number of empty channels.

The invention performs this function by filling empty channels of a WDM signal with noise which saturates the amplifier chain thereby causing an amplifier to raise the gain for the information channels of a WDM signal to their proper operating point, while minimizing the number of optical components necessary for the noise generating mechanism.

The invention provides a noise feedback loop which uses existing noise within the optical system to saturate a chain of amplifiers after a branching unit. The invention accomplishes this using filtered amplified spontaneous emission (ASE) noise. ASE noise arises in the amplification process. The resonant medium that provides amplification by the process of stimulated emission also generates spontaneous emission. The light arising from spontaneous emission represents a fundamental noise of laser amplifier noise.

The invention uses an existing drop amplifier which emits ASE noise as a side effect. A coupler connects the ASE noise to a filter. The filtered ASE noise is fed into an existing trunk amplifier by a second coupler. The trunk amplifier increases gain to the filtered ASE noise to a level high enough to saturate the amplifier chain. Thus, the invention does not require an external noise generating device.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
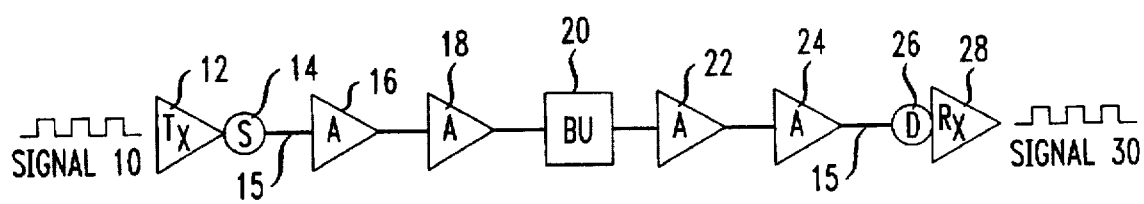
FIG. 1 is a diagram of a system with which an embodiment of the invention can be used.

Referring now in detail to the drawings wherein like parts are designated by like reference numerals throughout, there is illustrated in FIG. 1 a block diagram of a system in which an embodiment of the present invention may be deployed.

FIG. 1 illustrates an exemplary lightwave communications system, constituting wavelength division multiplexed (WDM) signal transmitted 10 entering optical communications transmitter 12. Transmitter 12 has optical source driver 14 that converts WDM signal 10 to a drive current that intensity modulates the source. Optical source driver 14 generates the energy that is coupled into transmission medium 15, which is typically optical fiber. The energy propagates down transmission medium 15 and is attenuated to a degree. To compensate for this attenuation, the energy is put into optical amplifiers 16 and 18 which increase the amplitude of the optical field while maintaining its phase. The amplified energy is routed into a branching unit 15 which drops $\lambda$ i and adds $\lambda$ i. After passing through branching unit 15, the energy is passed through optical amplifiers 22 and 24 and is place back on transmission medium 15. The energy exits transmission medium 15 at the other end and a majority is coupled into photodetector 26. The light energy that is absorbed in photodetector 26 is converted to a photocurrent. This photocurrent is then amplified in receiver 28 and converted to the proper signal format for WDM signal received 30 at the output.

Figure 2:
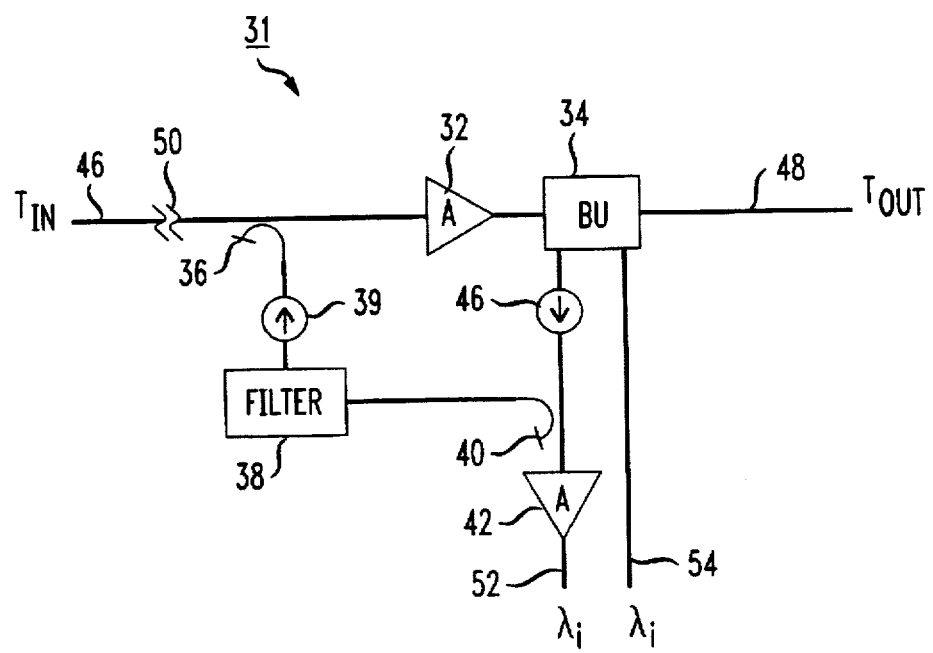
FIG. 2 is a diagram of an embodiment of the present invention.

FIG. 2 shows an embodiment of the present invention. Trunk in 46 passes optical energy to trunk amplifier 32. An example of trunk amplifier 32 is an EDFA. The energy is passed into branching unit 34, which drops λ i using drop line 52 from the signal inputted into the branching unit, and adds λ i using add line 54 to the signal outputted onto trunk out 48. Connected to drop line 52 is drop amplifier 42. An example of drop amplifier 42 is an EDFA. Also connected to drop line 52 is filter 38 by coupler 40 through opto-isolator 39. An example of coupler 40 is a conventional 3 decibel (dB) coupler. Filter 38 is connected to trunk in 46 by coupler 36. An example of coupler 36 is a conventional 10 dB coupler.

The invention operates in the following manner. A WDM signal is carried on trunk in 46 towards trunk amplifier 32. Fiber cut 50 causes the WDM signal to be lost. A null signal passes through trunk amplifier 32, which increases its gain from the compressed operation. The amplified null signal is inputted into branching unit 34. Branching unit 34 drops λ i from the amplified null signal using drop line 52. Opto-isolator 46 ensures the optical signal proceeds in one direction only. Drop line 52 passes λ i through drop amplifier 42. As λ i passes through drop amplifier 42 the amplifier emits backward ASE noise. This occurs because drop amplifier 42 is also in nominal compression, and since a fiber cut causes the drop signal to be lost, drop amplifier 42 will pull out of compression and generate more backward ASE noise. This ASE noise is directed to filter 38 by coupler 40.

In this embodiment, filter 38 is an approximately 10 nanometers (nm) bandpass filter with a center wavelength of approximately 1557 nm. Alternatively, filter 38 could be placed within the gain pass band of the amplifier chain, but out of the band for signal channels. By way of example, if a WDM signal comprised eight signal channels from 1554 nm to 1561 nm, the filter center wavelength (λf) would be 1550 nm with a filter bandpass (Δλf) being approximately 8 nm.

The filtered ASE noise passes through coupler 40 and is amplified by trunk amplifier 32. The amplified ASE noise passes through branching unit 34 which drops λ i, thus rejecting noise in a bandwidth (bw) around λ i in the path to trunk out 48. Add line 54 carries λ i into branching unit 34 which adds λ i to the amplified ASE noise. The result is a WDM signal with all channels filled with amplified ASE noise except for λ i. Consequently, the WDM signal saturates a downstream amplifier of the amplifier chain thereby reducing signal gain to channel λ i as the signal passes through the downstream amplifier. Accordingly, channel λ i is amplified to maintain its normal operating point as before the fiber cut.

Thus, the output of trunk amplifier 32 is looped back through drop amplifier 42 and filter 38 to input back into trunk amplifier 32. When the actual signal channels are present, loop back loss is higher than amplifier gain. This is also true when trunk input saturates the amplifier. Therefore, the introduction of excess noise into the WDM signal is minimized. When no channels are present, however, loop back loss is lower than gain (small signal gain), and the backward ASE noise from drop amplifier 42 is raised.

It is worthy to note that it is critical to obtain the correct noise level on trunk in 46 in order to saturate the amplifier chain, i.e., maintain the same gain in all amplifiers in the chain. The trunk amplifier, drop amplifier, couplers and filters, however, may be designed to automatically give the correct output power (signal or noise). Furthermore, branching unit 34 must be configured to maintain a constant output regardless of total power received by branching unit 34, e.g., full versus partial fiber cut.

Figure 3A:
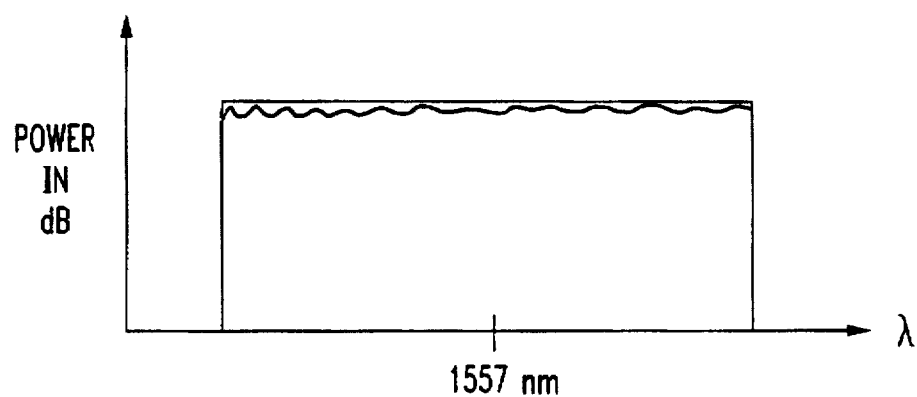
FIG. 3(a) is a wavelength versus power plotting of an amplified ASE noise signal used in an embodiment of the invention.

FIG. 3(a) is a wavelength versus power plotting of an amplified ASE noise signal used in an embodiment of the invention. The magnitude of the ASE noise signal is a function of power from trunk amplifier 32 plus drop amplifier 42 plus the loopback loss and gain compression from trunk amplifier.

Figure 3B:
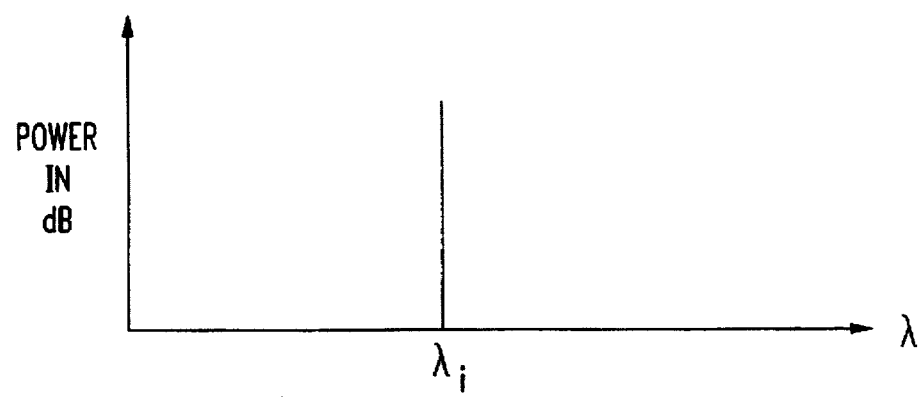
FIG. 3(b) is a wavelength versus power plotting of a single channel $\lambda$ i added to a null signal created by a fiber cut.

FIG. 3(b) is a wavelength versus power plotting of a single channel λ i added to a null signal created by a fiber cut. As this signal passes through a downstream amplifier its power level is elevated to higher than normal levels due to increased gain compression.

Figure 3C:
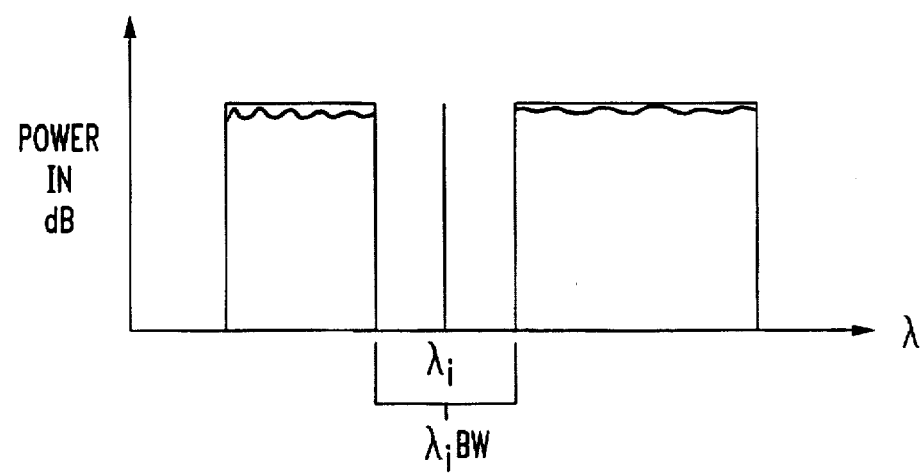
FIG. 3(c) is a wavelength versus power plotting of a single channel $\lambda$ i added to an amplified ASE noise signal used in an embodiment of the invention.
Figure 4:
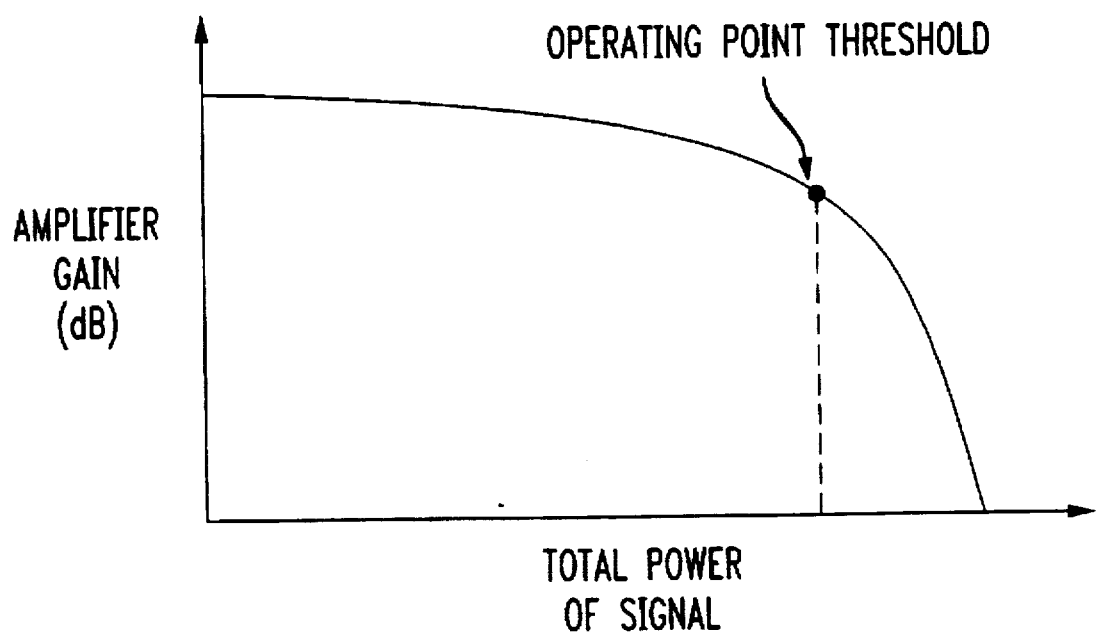
FIG. 4 is a amplifier gain versus total power plotting of a signal showing its operating point threshold.

FIG. 3(c) is a wavelength versus power plotting of a single channel λ i having been added to an amplified ASE noise signal used in an embodiment of the invention. As the signal passes through a downstream amplifier it saturates the amplifier thereby reducing signal gain to channel λ i. The downstream amplifier elevates the power of channel λ i to its normal operating point.

Although a preferred embodiment is specifically illustrated and described herein, it will be appreciated that modifications and variations of the present invention are covered by the above teachings and within the purview of the appended claims without departing from the spirit and intended scope of the invention. For example, although an embodiment of the invention discusses a WDM signal containing a single information channel λ i, it can be appreciated that the invention will work for any number of information channels remaining after a fiber cut. Similarly, the ASE noise source could also be an amplifier on add line 54 (not shown in FIG. 2), a stand alone amplifier, or another light source such as a DFB laser.

What is claimed is:

1. An apparatus for using filtered noise to saturate an amplifier chain when new data is added to a WDM signal, comprising:

a first amplifier emitting noise;

a coupler connected to said first amplifier for directing the noise away from said first amplifier;

a filter connected to said coupler for filtering the noise directed by said coupler from said first amplifier; and a second amplifier connected to said filter for amplifying the noise thereby saturating the amplifier chain.

* * * * *

UNITED STATES PATENT AND TRADEMARK OFFICE
CERTIFICATE OF CORRECTION

PATENT NO. : 5,719,697

DATED : February 17, 1998

INVENTOR(S) : Bo PEDERSEN

It is certified that error appears in the above-identified patent and that said Letters Patent is hereby corrected as shown below:

On the title page, item [54] and column 1, lines 1-4, change the title to read --METHOD AND APPARATUS FOR SATURATING AN OPTICAL AMPLIFIER CHAIN TO PREVENT OVER AMPLIFICATION OF A WAVELENGTH DIVISION MULTIPLEXED SIGNAL--.

Signed and Sealed this

Twenty-second Day of December, 1998

Attest:

BRUCE LEHMAN

Attesting Officer    Commissioner of Patents and Trademarks